US012736675B2

(12) United States Patent
Wise

(10) Patent No.: US 12,736,675 B2
(45) Date of Patent: Sep. 15, 2026

(54) TIME OF FLIGHT DETECTION SYSTEMS WITH EFFICIENT PHASE MEASUREMENT

(71) Applicant: Banner Engineering Corp., Minneapolis, MN (US)

(72) Inventor: Ashley Wise, Plymouth, MN (US)

(73) Assignee: Banner Engineering Corp., Minneapolis, MN (US)

( * ) Notice: Subject to any disclaimer, the term of this patent is extended or adjusted under 35 U.S.C. 154(b) by 436 days.

(21) Appl. No.: 18/546,124

(22) PCT Filed: Sep. 16, 2022

(86) PCT No.: PCT/US2022/076600
§ 371 (c)(1),
(2) Date: Aug. 11, 2023

(87) PCT Pub. No.: WO2023/044449
PCT Pub. Date: Mar. 23, 2023

(65) Prior Publication Data

US 2024/0134046 A1 Apr. 25, 2024
US 2024/0230902 A9 Jul. 11, 2024

Related U.S. Application Data

(60) Provisional application No. 63/261,317, filed on Sep. 17, 2021.

(51) Int. Cl.
*G01S 17/36* (2006.01)
*G01S 7/4912* (2020.01)
*G01S 7/4915* (2020.01)

(52) U.S. Cl.
CPC ............ *G01S 17/36* (2013.01); *G01S 7/4915* (2013.01); *G01S 7/4918* (2013.01)

(58) Field of Classification Search
CPC ....... G01S 17/36; G01S 7/4915; G01S 7/4918
See application file for complete search history.

(56) References Cited

U.S. PATENT DOCUMENTS 5,241,360 A 8/1993 Key et al.
5,831,719 A * 11/1998 Berg ...................... G01B 11/24 356/613

(Continued)

FOREIGN PATENT DOCUMENTS

CN 102694998 A 9/2012
CN 103472454 A 12/2013

(Continued)

OTHER PUBLICATIONS

International Search Report and Written Opinion of the International Searching Authority in related International Application No. PCT/US2022/076600, dated Jan. 20, 2023, 11 pages.

(Continued)

*Primary Examiner* — Francis Geroleo
(74) *Attorney, Agent, or Firm* — Thompson Patent Law Offices PC

(57) ABSTRACT

Apparatus and associated methods relate to a select frequency phase measurement (SFPM) time of flight (TOF) system including an emitter and a receiver. The emitter may generate a modulated emitted signal by at least one frequency. The emitted signal may, for example, be a pulsed light signal. The receiver may generate a signal in response to receiving a reflection of the emitted signal off a target object. An ADC element may digitize a signal generated by the receiving element, and a reference signal generated by a monitored signal of the modulated emitted signal. A processing element may generate a phase signal using single frequency analysis of the digitized signals. A distance measurement signal may be generated as a function of the phase signal. Various embodiments may, for example, advanta- (Continued)

geously enable sub-millisecond sensor response times using commodity processing elements.

20 Claims, 15 Drawing Sheets

(56) References Cited

U.S. PATENT DOCUMENTS

| | | | | |
|---|---|---|---|---|
| 7,636,150 | B1 | 12/2009 | McCauley et al. | |
| 7,936,449 | B1 | 5/2011 | Bamji et al. | |
| 9,075,144 | B1 | 7/2015 | Straub et al. | |
| 2007/0024841 | A1 * | 2/2007 | Kloza | G01S 7/486 356/5.03 |
| 2010/0191418 | A1 * | 7/2010 | Mimeault | B60Q 1/0023 356/4.01 |
| 2010/0277713 | A1 * | 11/2010 | Mimeault | G01S 7/4865 356/5.01 |
| 2012/0092644 | A1 | 4/2012 | Spruck et al. | |
| 2012/0242975 | A1 * | 9/2012 | Min | G01S 17/894 356/5.03 |
| 2017/0261605 | A1 * | 9/2017 | Chu | G01S 17/36 |
| 2018/0164438 | A1 * | 6/2018 | Van Der Tempel | G01S 7/484 |
| 2019/0086518 | A1 | 3/2019 | Hallstig et al. | |
| 2019/0369217 | A1 | 12/2019 | Policht | |
| 2020/0018834 | A1 | 1/2020 | Boutaud | |
| 2020/0393565 | A1 | 12/2020 | Amr | |
| 2021/0270946 | A1 | 9/2021 | Sánchez et al. | |
| 2021/0333376 | A1 * | 10/2021 | Shimizu | G01S 13/84 |
| 2022/0196838 | A1 | 6/2022 | Kapusta | |
| 2023/0131584 | A1 * | 4/2023 | Bayer | G01S 13/584 342/109 |

FOREIGN PATENT DOCUMENTS

| | | | |
|---|---|---|---|
| CN | 103748479 | A | 4/2014 |
| CN | 108732578 | A | 11/2018 |
| CN | 111492264 | A | 8/2020 |
| CN | 112816950 | A | 5/2021 |
| DE | 102016217838 | A1 | 3/2018 |
| EP | 3719537 | B1 | 3/2021 |
| JP | 5936401 | B2 | 6/2016 |
| WO | 2021044534 | A1 | 3/2021 |
| WO | 2021168866 | A1 | 9/2021 |

OTHER PUBLICATIONS

European Official Communication for EP Application No. 22870988.7 mailed Apr. 25, 2025; 33 pages.

Extended European Search Report for EP Application No. 22870988.7; mailed Aug. 5, 2024; 63 pages.

First Chinese Office Action for CN Application No. 202280015377.7; dated Dec. 15, 2023; 6 pages.

* cited by examiner

800

900

TIME OF FLIGHT DETECTION SYSTEMS WITH EFFICIENT PHASE MEASUREMENT

CROSS-REFERENCE TO RELATED APPLICATIONS

This application claims the benefit of U.S. Provisional Application Ser. No. 63/261,317, titled "Time of Flight Detection Systems with Efficient Phase Measurement," filed by Ashley Wise, on Sep. 17, 2021.

This application incorporates the entire contents of the foregoing application(s) herein by reference.

The subject matter of this application may have common inventorship with and/or may be related to the subject matter of the following:

- U.S. application Ser. No. 15/625,949, titled "Open-Loop Laser Power-Regulation," filed by Ashley Wise on Jun. 16, 2017, and issued as U.S. Pat. No. 9,985,414 on May 29, 2018;
- U.S. Application Serial No. PCT/US21/71304, titled "Open-Loop Photodiode Gain Regulation," filed by Ashley Wise, et al., on Aug. 27, 2021;
- U.S. Application Ser. No. 63/107,311, titled "Frequency Domain Opposed-Mode Photoelectric Sensor," filed by David S. Anderson, et al., on Oct. 29, 2020;
- U.S. application Ser. No. 17/036,255, titled "Near Range Radar," filed by Ashley Wise, et al., on Sep. 29, 2020;
- U.S. Application Ser. No. 62/924,025, titled "Near Range Radar," filed by Ashley Wise, et al., on Oct. 21, 2019;
- U.S. application Ser. No. 17/446,142, titled "Open-Loop Photodiode Gain Regulation," filed by Ashley Wise, et al., on Aug. 26, 2021; and
- U.S. Application Ser. No. 63/071,080, titled "Open-Loop Photodiode Gain Regulation," filed by Ashley Wise, et al., on Aug. 27, 2020.

This application incorporates the entire contents of the foregoing application(s) herein by reference.

TECHNICAL FIELD

Various embodiments relate generally to phase measurement.

SUMMARY

Apparatus and associated methods relate to a select frequency phase measurement (SFPM) time of flight (TOF) system including an emitter and a receiver. The emitter may generate a modulated emitted signal by at least one frequency. The emitted signal may, for example, be a pulsed light signal. The receiver may generate a signal in response to receiving a reflection of the emitted signal off a target object. An ADC element may digitize a signal generated by the receiving element, and a reference signal generated by a monitored signal of the modulated emitted signal. A processing element may generate a phase signal using single frequency analysis of the digitized signals. A distance measurement signal may be generated as a function of the phase signal. Various embodiments may, for example, advantageously enable sub-millisecond sensor response times using commodity processing elements.

Various embodiments may achieve one or more advantages. Various embodiments may, for example, advantageously determine a phase offset between an emitted and received signal using an efficient phase calculation algorithm applied based on select (e.g., known) frequencies. Various embodiments may, for example, advantageously enable rapid response times using commodity processing circuits (e.g., inexpensive microprocessors, by combining commodity grade integrated circuits (ICs)). For example, some SFPM embodiments may advantageously enable sub-millisecond response times in a TOF sensor using inexpensive microprocessors. Various embodiments may advantageously provide efficient, indirect TOF measurement systems. For example, some embodiments may apply multiple modulation frequencies to advantageously employed to disambiguate the distance past a full wavelength of phase shift. Some embodiments may, for example, simultaneously sample both emitted and received signals to advantageously allow faster response speed. Some embodiments may, for example, provide gain control to advantageously span a 1:10000 dynamic range or more of possible inputs.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, to help introduce discussion of various embodiments, a select frequency phase measurement (SFPM) time of flight (TOF) sensor is introduced with reference to FIGS. 1-2. Second, that introduction leads into a description with reference to FIGS. 3-4 of some exemplary embodiments of TOF sensors. Third, with reference to FIGS. 5-9, practical measurements and determination methods are described in application to exemplary SFPM TOF sensors. Fourth, with reference to FIG. 10, the discussion turns to exemplary embodiments that illustrate a SFPM TOF system with high selective dynamic gain. Fifth, and with reference to FIGS. 11-14, this disclosure turns to a review of experimental data and a discussion of phase measurement based on reflected modulated waveforms. Seventh, the document introduces an exemplary SFPM TOF method with reference to FIG. 15. Finally, the document discusses further embodiments, exemplary applications and aspects relating to SFPM TOF distance measuring systems.

Figure 1:
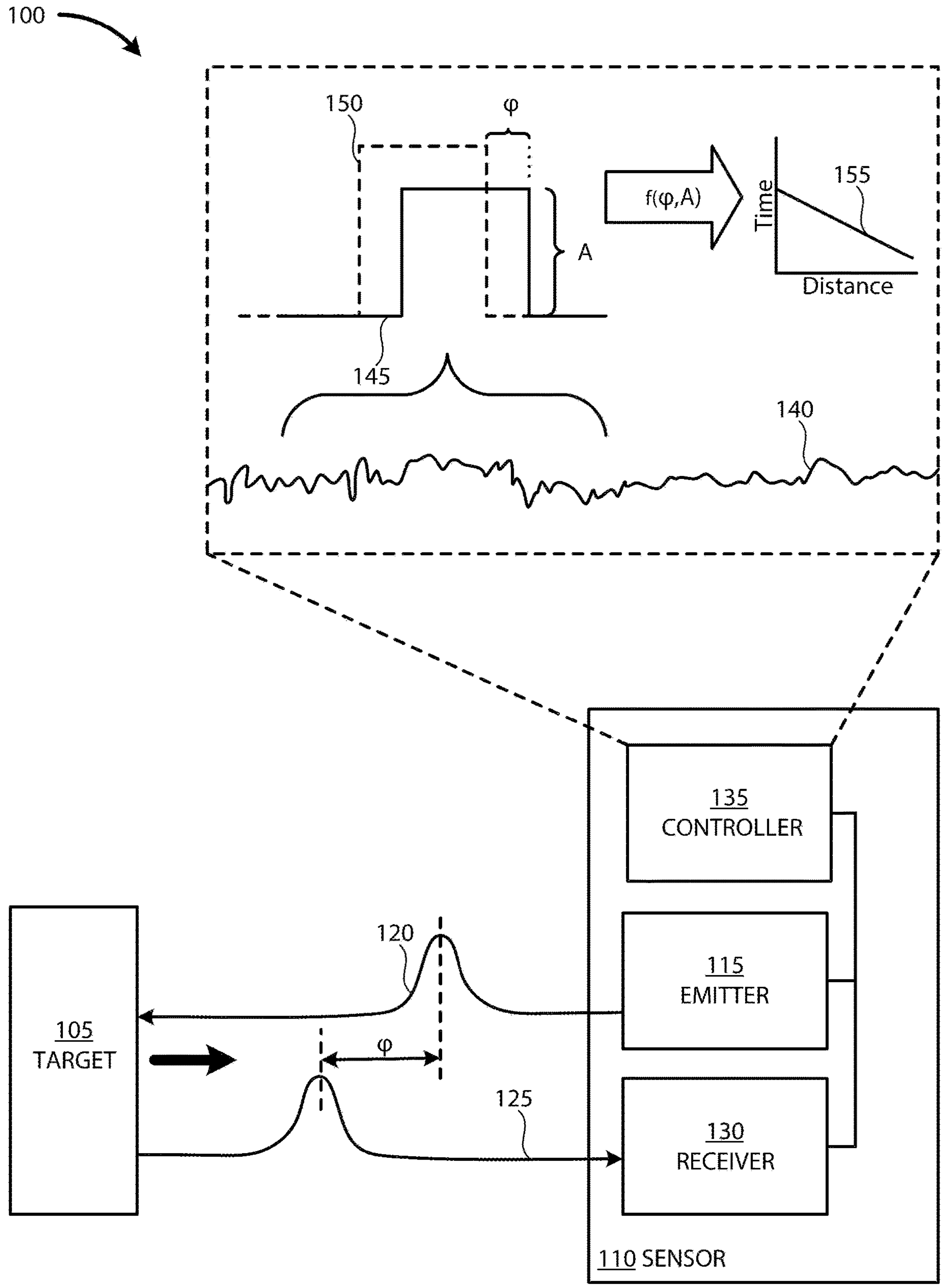
FIG. 1 depicts an exemplary select frequency phase measurement (SFPM) time of flight (TOF) sensor employed in an illustrative use-case scenario.

FIG. 1 depicts an exemplary select frequency phase measurement (SFPM) time of flight (TOF) sensor employed in an illustrative use-case scenario. In an exemplary use-case scenario 100, a distance between a target 105 is decreasing relative to a sensor 110. The target may, for example, be a moving object. The target may, for example, include an object on a conveyor belt. The target may, for example, include (a portion of) machinery. The target may, for example, include fluid in a reservoir. The sensor 110 may, for example, be configured to measure distance to the target 105.

The sensor 110 includes an emitter module 115. The emitter module 115 emits a pulsed emitted signal 120. The pulsed emitted signal 120 is at least partially reflected off of the target 105, causing a reflected signal 125 to return to the sensor 110. A phase of the reflected signal 125 is offset from a phase of the pulsed emitted signal 120 by a phase offset f. The sensor 110 includes a receiver module 130. The receiver module 130 receives the reflected signal 125.

The pulsed emitted signal 120 may, for example, include a light signal. The modulation of the pulsed emitted signal 120 may, for example, be digital modulation. A phase of the pulsed emitted signal 120 may, for example, be known. As depicted, the emitter module 115 is operably coupled to a controller 135 (e.g., including one or more (micro) processor(s)). The controller 135, for example, may monitor a phase of the emitted signal.

The controller 135 is operably coupled to the receiver module 130. The controller 135 may be configured to determine a distance between the sensor 110 and the target 105 based on f. The receiver module 130 may, for example, generate a received signal 140 in response to the reflected signal 125. The received signal may, for example, include noise. The noise may, for example, include circuit effects. The noise may, for example, include ambient light. The contribution of the reflected signal 125 to the received signal 140 may, for example, be obscured by noise. The controller 135 processes the received signal 140 to generate a signal 145 corresponding to a pulse in the reflected signal 125. The controller 135 may compare the signal 145 to a processed emitted signal 150 corresponding to a pulse in the pulsed emitted signal 120. The controller 135 determines an amplitude (A) of the signal 145. The controller 135 may determine $\phi$ based on a phase difference (e.g., in a frequency domain) between the signal 145 and the processed emitted signal 150. In the depicted example, the sensor 110 may determine a distance measurement 155 (e.g., vs time, as depicted) as a function of the phase offset $\phi$ and the amplitude A.

The controller 135 may, for example, operate on a digitized signal corresponding to the received signal 140. The controller 135 may, for example, operate on select frequencies in the received signal 140. For example, the emitter module 115 may emit the pulsed emitted signal 120 including at least one known frequency. The controller 135 may, for example, perform a frequency analysis on the received signal 140 only at the known frequencies. The frequency analysis may include a single frequency analysis algorithm. The single frequency analysis algorithm may, for example, include a single-bin discrete Fourier transform algorithm. The frequency analysis algorithm may, for example, include a Goertzel analysis.

Various embodiments may, for example, advantageously determine a phase offset between an emitted and received signal using an efficient phase calculation algorithm applied based on select (e.g., known) frequencies. Various embodiments may, for example, advantageously enable rapid response times using commodity processing circuits (e.g., inexpensive microprocessors, by combining commodity grade integrated circuits (ICs)). For example, some SFPM embodiments may advantageously enable sub-millisecond response times in a TOF sensor using inexpensive microprocessors. Various embodiments may advantageously provide efficient, indirect TOF measurement systems.

Figure 2:
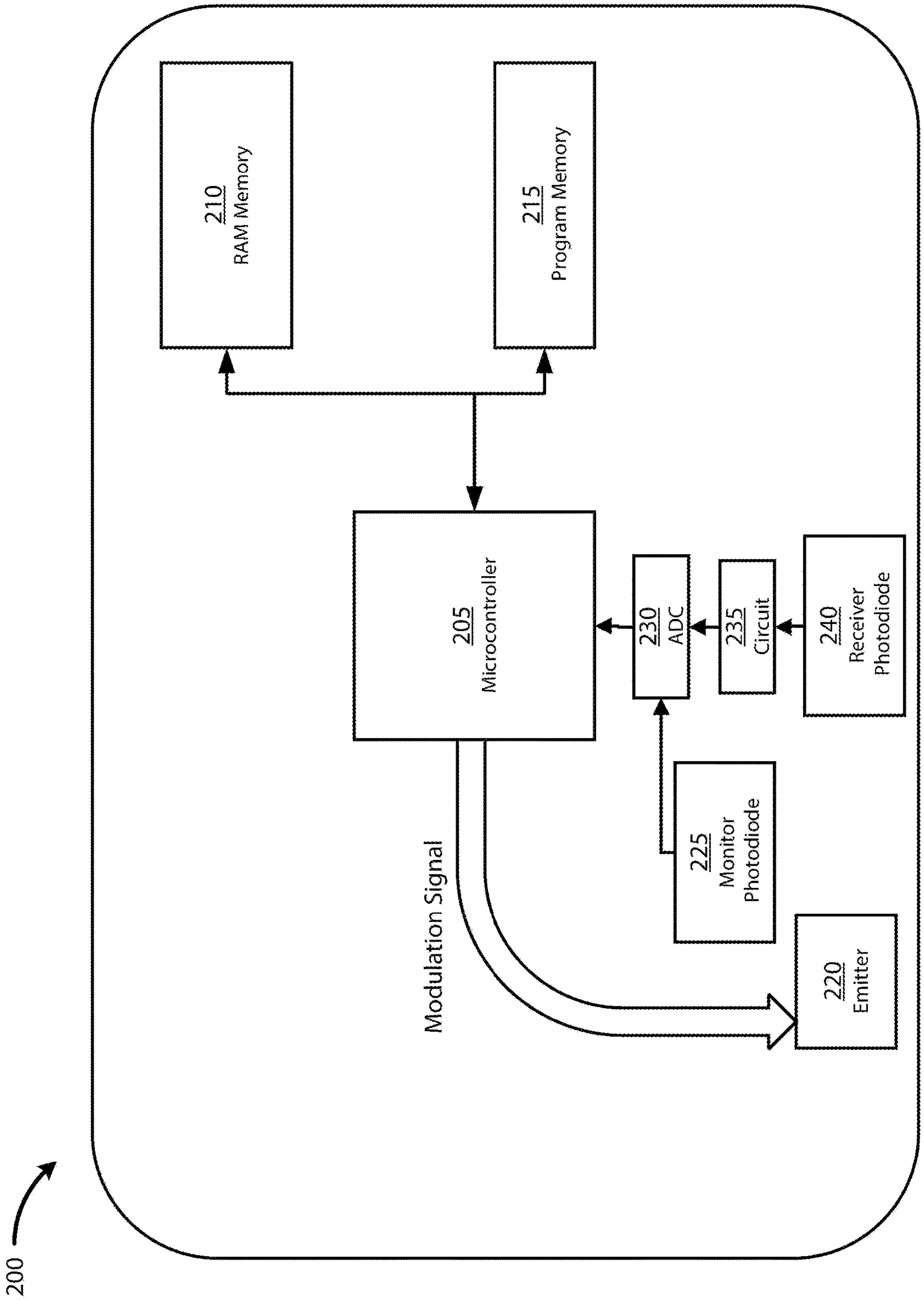
FIG. 2 depicts an exemplary block diagram of an exemplary SFPM TOF system.

FIG. 2 depicts an exemplary block diagram of an exemplary SFPM TOF system. An SFPM TOF system 200 includes a controller 205 (labeled "microcontroller"). The controller 205 may include at least one processor. For example, as depicted, the controller 205 includes a microcontroller. The controller 205 is operably coupled to a random-access memory module (RAM memory 210). The controller 205 is operably coupled to a program memory module 215. For example, program memory module 215 may include a program of instructions. The controller 205 may be configured to execute the program of instructions. The program memory module 215 may, for example, include non-volatile memory.

The controller 205 is further operably coupled to an emitter module 220 (e.g., emitter module 115). The controller 205 may communicate a modulation signal to the emitter module 220 (e.g., the emitter 1005 and/or the emitter power module 1010) such that the emitter module 220 generates a signal (e.g., pulsed emitted signal 120) with a known modulation scheme (e.g., including phase).

A monitor photodiode 225 may be configured to monitor the signal emitted by the emitter module 220. For example, signals emitted by the emitter module 220 may be distorted by signal noise (e.g., noises introduced by the emitter circuitry). In some examples, the monitor photodiode 225 may measure an actual emitted signal with the signal noise. In some implementations, the emitter module may include adjustable emitter power. For example, the microcontroller 205 may increase a gain output of the emitter module 220. In some examples, using measured signals from the monitor photodiode 225 may advantageously compensate changes in the emitter power. Accordingly, the SFPM TOF system 200 may use an accurate emitted signal for the single frequency analysis.

The monitor photodiode 225 is operably coupled to an ADC 230. The controller 205 is further operably coupled to the ADC 230. The ADC 230 may generate a (digitized) signal as a function of a signal generated by the monitor photodiode 225 corresponding to the emitted signal.

The ADC 230 may generate a (digitized) signal as a function of a signal received from a circuit 235. The circuit 235 may generate the signal as a function of a signal received from a receiver photodiode 240 (e.g., part of the receiver module 130). The receiver photodiode 240 may, for example, receive a reflection (e.g., reflected signal 125) of the emitted signal.

Various embodiments may, for example, provide (industrial) distance measurement sensors with small product dimensions and/or at low price points. Various embodiments may, for example, advantageously permit the use of low-cost microprocessor circuits in place of application-specific integrated circuits (ASICs). For example, the microprocessor circuit may be implemented by using one or more integrated circuits (ICs). Accordingly, such embodiments may advantageously save, for example, millions of dollars in development of ASIC(s).

Various embodiments may, for example, advantageously permit the use of low-cost microprocessor circuits in place of field-programmable gate arrays (FPGAs). Accordingly, various such embodiments may advantageously permit smaller board size and/or lower cost. Various embodiments may advantageously implement TOF without an ASIC, FPGA, and/or higher-end processor.

In various implementations, the SFPM TOF system 200 determine a distance between a sensor device (e.g., the sensor 110) and a target object (e.g. the target 105) based on a phase offset determined using a first digital single frequency analysis of a received signal from the receiver photodiode 240, and a second digital single frequency analysis of the reference signal as measured by the monitor photodiode 225. The reference signal, for example, may be generated based on a modulated waveform emitted by the emitter module 220. The received signal, for example, may include a reflection of the modulated waveform from the target object. For example, the received signal and the reference signal may be digitized by the ADC 230. For example, the first and second digital single frequency analyses are each performed at a predetermined drive frequency of the modulated waveform.

Figure 3:
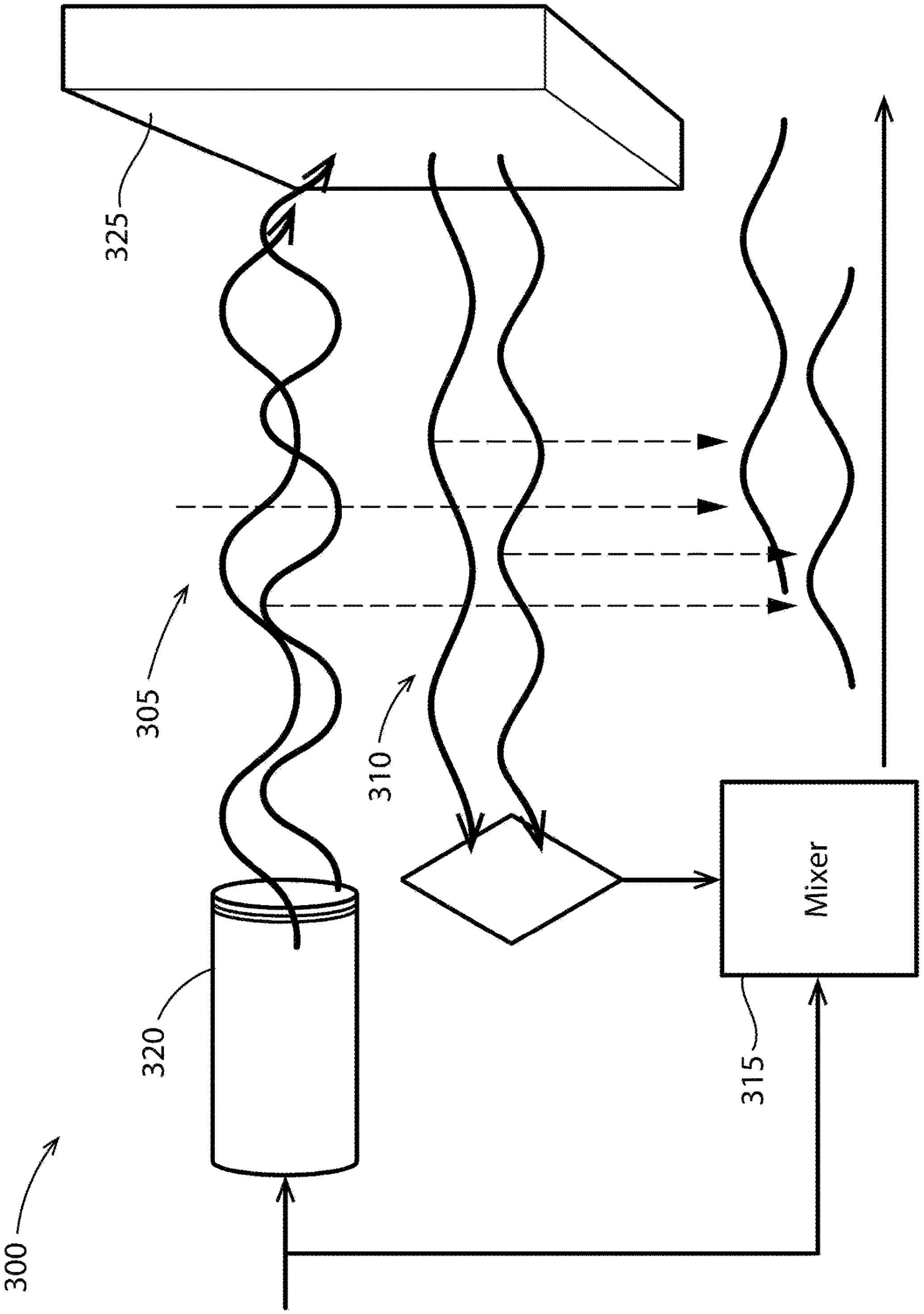
FIG. 3 depicts an exemplary amplitude modulation scheme for detecting phase.

FIG. 3 depicts an exemplary amplitude modulation scheme for detecting phase. Various embodiments may, for example, be configured as indirect TOF sensors. For example, some embodiments may be configured to use amplitude modulation, as depicted in illustration 300. A modulation wave 305 (e.g., of light) may be emitted at one or more frequencies. The received signal 310 may include a reflected wave mixed with the emitted modulation wave 305. In this example, the received signal 310 may be processed by a mixer 315. The output of the mixer 315, for example, may be proportional to a phase shift between the modulation wave 305 and the received signal and/or a distance between an emitter 320 and a target 325.

In some implementations, more than one frequency may, for example, be used to measure the distance. For example, multiple frequencies may be advantageously employed to disambiguate the distance past a full wavelength of phase shift.

Figure 4:
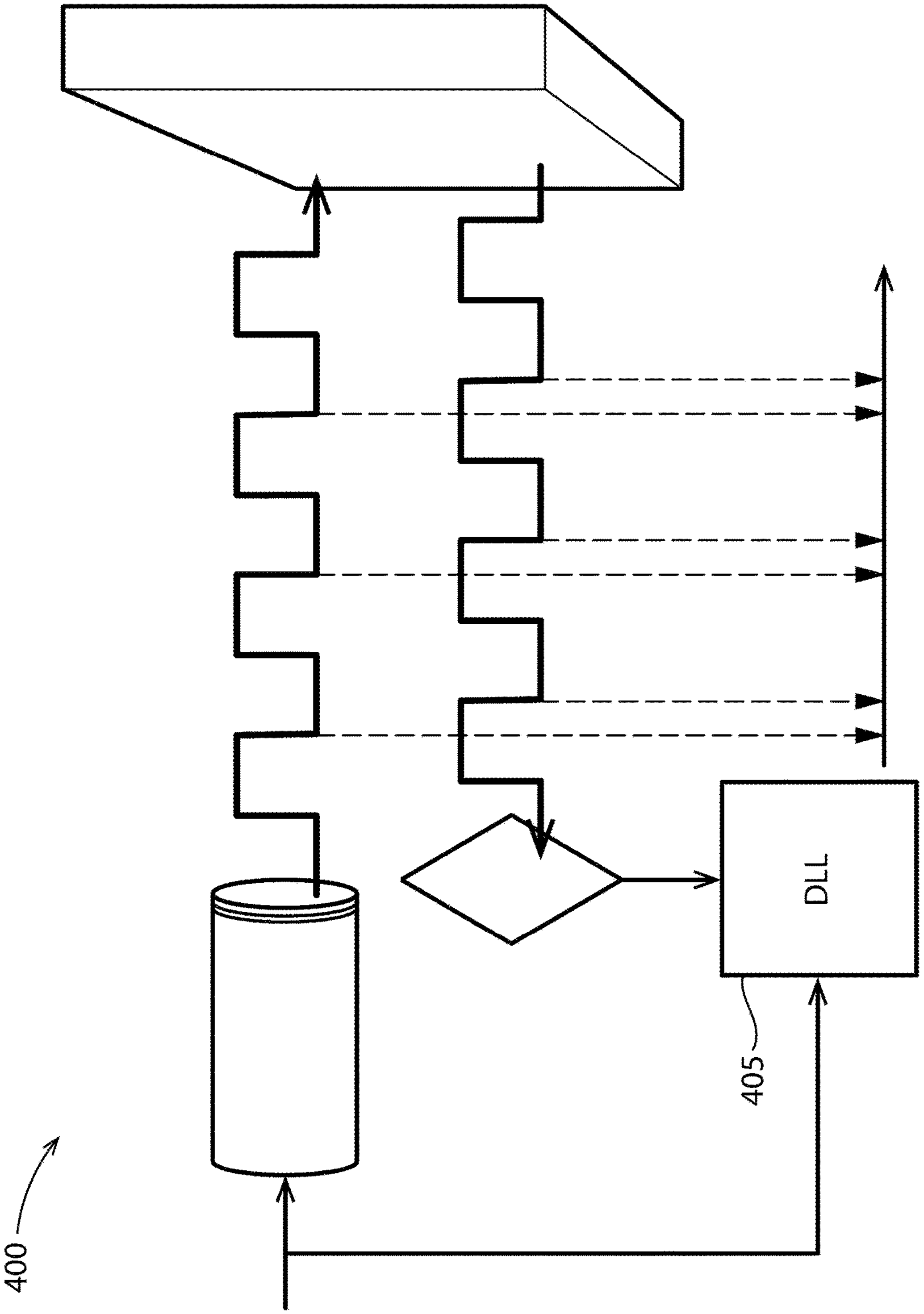
FIG. 4 depicts an exemplary pulse-train time of flight phase detection scheme.

FIG. 4 depicts an exemplary pulse-train time of flight phase detection scheme. Various embodiments may apply a form of pulse-train TOF, as depicted in illustration 400. Pulse-train TOF is an indirect method that may emit a modulated light signal. The modulated light signal may, for example, not necessarily be a sine wave. The received signal may, for example, be processed using an analog delay-lock-loop (DLL 405) which can determine the phase shift of the incoming light pulse.

Analog indirect TOF methods may, for example, require hardware for an analog mixer (e.g., the mixer 315 as depicted with reference to FIG. 3) or the analog DLL 405 (e.g., as depicted with reference to FIG. 4). In some examples, performing the measurement in hardware may require sufficient signal-to-noise of the received signal.

Figure 5:
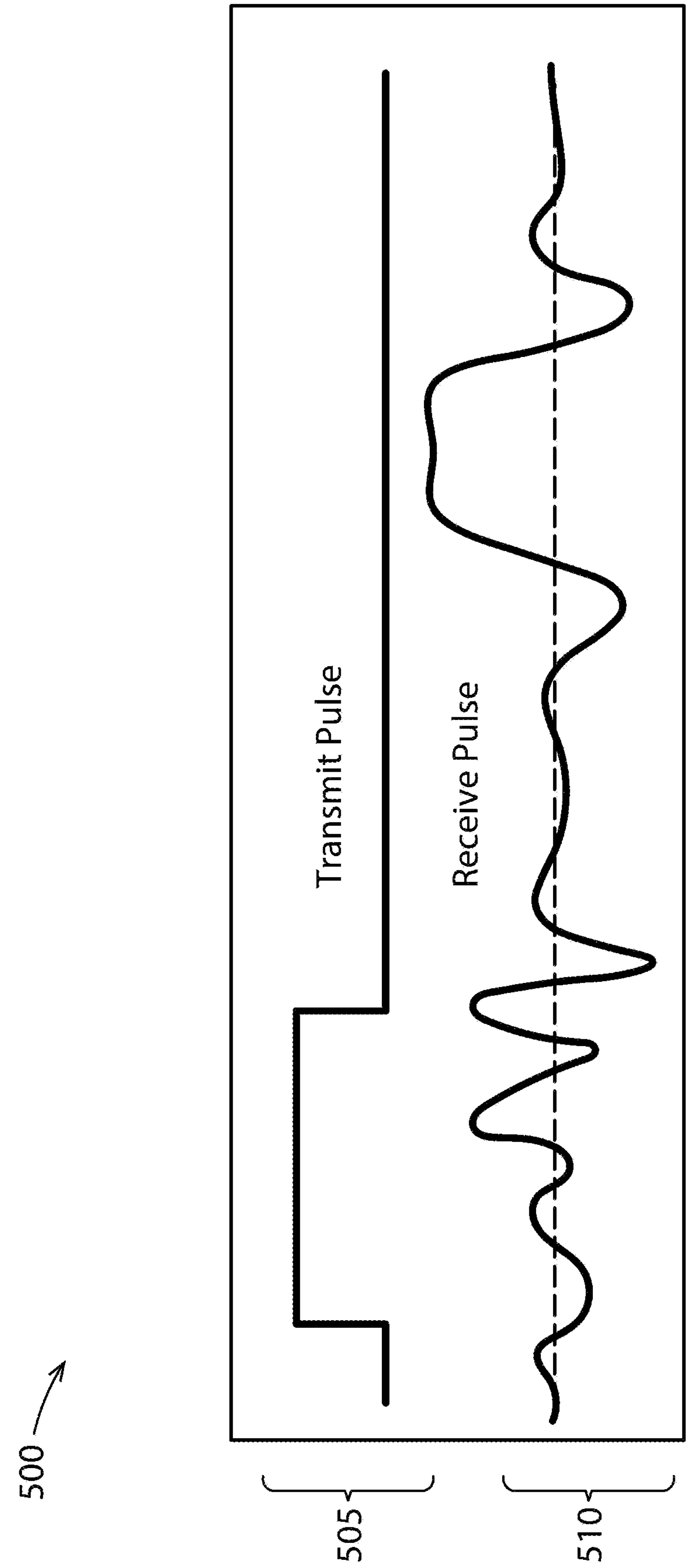
FIG. 5 depicts an exemplary received detection pulse obscured by noise.

FIG. 5 depicts an exemplary received detection pulse obscured by noise. The exemplary illustration 500 may, for example, correspond to (light) reflection of a transmitted signal 505 off dark targets and/or (light) reflection at long ranges. In the depicted example, a received signal 510 may, for example, be too similar to a noise for an analog measurement to be effective. Some embodiments may provide digital signal processing (e.g., mixing or pulse-train analysis) to reduce noise level for distance measurement analysis.

Figure 6:
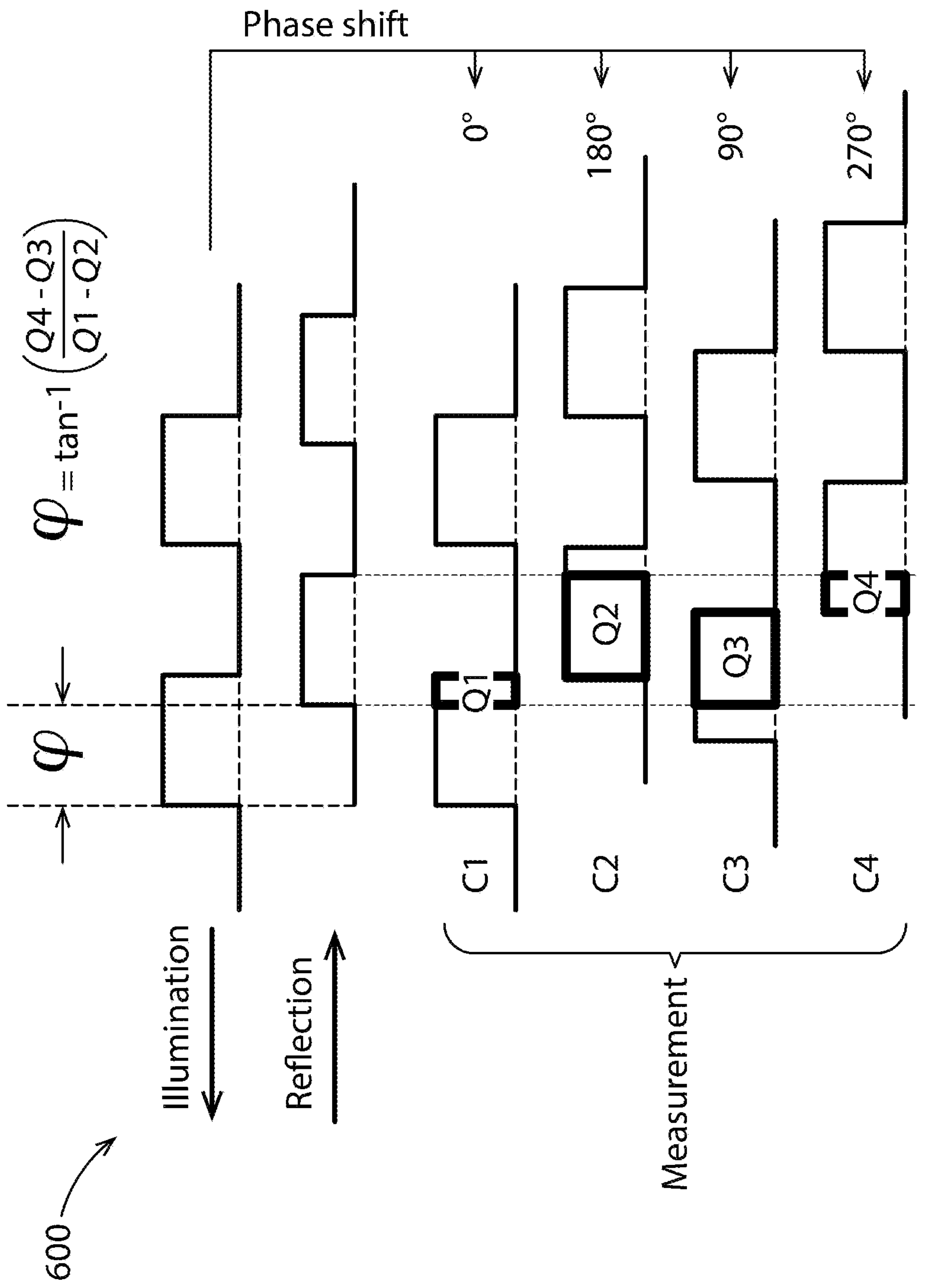
FIG. 6 depicts an exemplary phase integration scheme.

FIG. 6 depicts an exemplary phase integration scheme. Some embodiments may, for example, implement phase integration, such as an exemplary phase integration scheme 600. Phase integration may, for example, advantageously disambiguate a received signal from noise in a signal with low signal-to-noise ratio. Phase integration may, for example, integrate charge over multiple pulses. For example, some schemes may integrate over hundreds or thousands of pulses. As shown, measurement of phase at a number of predetermined phase shifts are measured. Based on the measurement, a distance between an emitter and a target may be computed based on a predetermined modulation frequency of the emitted waveform.

Phase integration may, for example, require very long integration times. For example, phase integration may require 100's or 1000's of microseconds and may require repetition over several phase-shift cycles, resulting in 10's of milliseconds of overall response time. In contrast, industrial sensor TOF solutions may require sub-millisecond response times. Long integration times may, for example, make a system very susceptible to ambient light noise. For example, strong ambient light may saturate a signal.

Various embodiments may, for example, advantageously provide an efficient indirect time-of-flight system. Various embodiments may, for example, advantageously overcome limitations of analog phase shift measurements. For example, a receiving signal may be digitized. In some embodiments the receiving signal may, for example, be digitized using a high-speed analog to digital converter (e.g., ADC 1040 as described with reference to FIG. 10). The ADC may, for example, be integral to a microprocessor. In various exemplary embodiments, the ADC may, by way of example and not limitation, have a capacity of between 2 mega-samples-per-second (Msps) to 7.5 Msps. In some embodiments a dedicated ADC may be provided. The ADC may, for example, have a processing capacity in a 10's of Msps range.

In various embodiments a modulation frequency of an emitted signal (e.g., emitted light signal) may be below a Nyquist frequency of the ADC sampling. As an illustrative example, if a 40 Msps ADC is provided, the emitted signal may have a modulation below 20 MHz.

Figure 7:
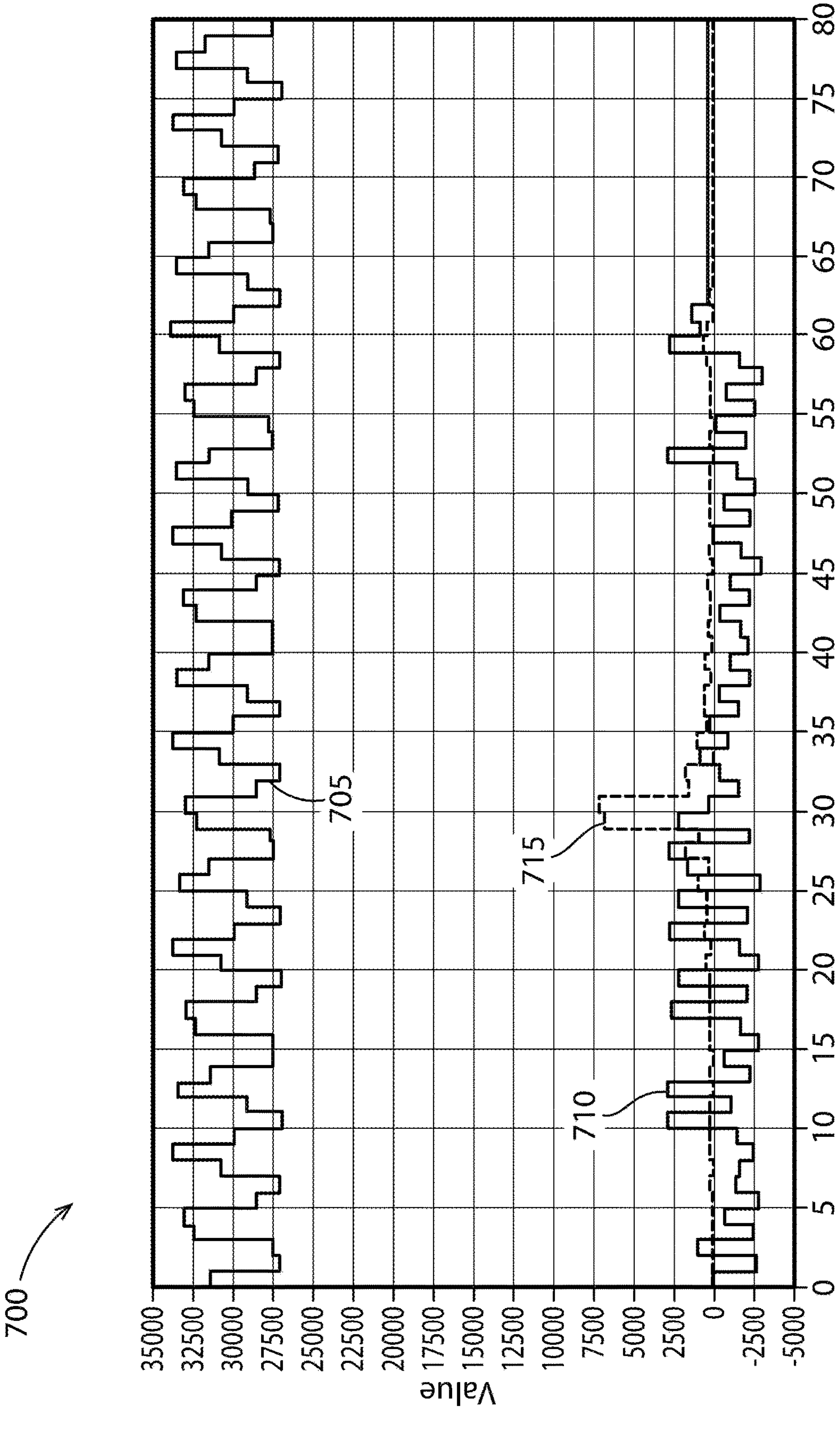
FIG. 7 depicts an exemplary discrete received signal and corresponding exemplary magnitude and phase signal determined by frequency analysis.

FIG. 7 depicts an exemplary discrete received signal and corresponding exemplary magnitude and phase signal determined by frequency analysis. In a plot 700, frequency analysis is applied to a received ADC sampled signal 705. The frequency analysis may, for example, include Fast Fourier Transform (FFT). The frequency analysis may, for example, include Discrete Fourier Transform (DFT). The frequency analysis generates a phase signal 710 corresponding to the received ADC sampled signal 705. The frequency analysis further generates a magnitude signal 715 corresponding to the received ADC sampled signal 705.

The phase may, for example, be computed relative to a system clock (e.g., of the controller 205). The system clock may, for example, be used to drive emitter modulation. The phase shift may be directly proportional to the transit-timedistance of light. For a 10 MHz light modulation, 1 mm of distance resolution is equivalent to 0.0004 radians of phase resolution.

A full DFT or FFT may, for example, be computationally expensive. For example, a full DFT or FFT may take 100's of microseconds to compute on some microcontrollers. Various embodiments may, for example, achieve fast phase measurement by utilizing a single-frequency analysis method. The single-frequency analysis method may, for example, compute a single frequency bin of a DFT. This computation may be several orders of magnitude faster than a full FFT. Various embodiments may employ one or more single-frequency measurement methods configured to measure phase. Accordingly, various embodiments may advantageously be configured to rapidly determine phase of a reflected signal (e.g., relative to an emitted signal) correlating to distance.

In some embodiments, a single-frequency measurement may, for example, include a Goertzel analysis. In an exemplary Goertzel implementation, a first stage may calculate an intermediate sequence, s(n):

$$s(n)=x(n)+2\cos(\omega_0)s(n-1)-s(n-2) \quad \text{Equation 1:}$$

Where:

x(n) is an input sequence (e.g., corresponding to an input signal), $\omega_0$ is a frequency to be analyzed (e.g., normalized to radians per sample), and n is an index variable.

For example, the first stage may apply an infinite impulse response filter to the input signal. The cosine term may, for example, be implemented as a (precomputed) constant (e.g., advantageously saving computational cost during runtime).

In the exemplary Goertzel implementation, a second stage may apply a filter to s(n), producing an output sequence y(n):

$$y(n)=s(n)-e^{j\omega_0}s(n-1) \quad \text{Equation 2:}$$

Where: $j=\sqrt{(-1)}$, i.e., an imaginary number.

The filter applied in the second stage may, for example, be a finite impulse response filter. The Goertzel algorithm may, for example, advantageously enable computationally efficient single frequency analysis.

In embodiments in which a frequency of modulation is known, only a single frequency may be required for frequency analysis. Various embodiments may advantageously apply the Goertzel algorithm to compute phase. The phase may directly correlate to distance. Accordingly, various embodiments may advantageously apply a single-frequency Goertzel analysis to one or more select frequencies (e.g., of modulation) to determine distance from a received signal (e.g., relative to an emitted signal).

Various embodiments may, for example, increase signal to noise by averaging many measurements. Averaging the received signal may, for example, be advantageously enabled because the signal has been digitized by an ADC.

Figure 8:
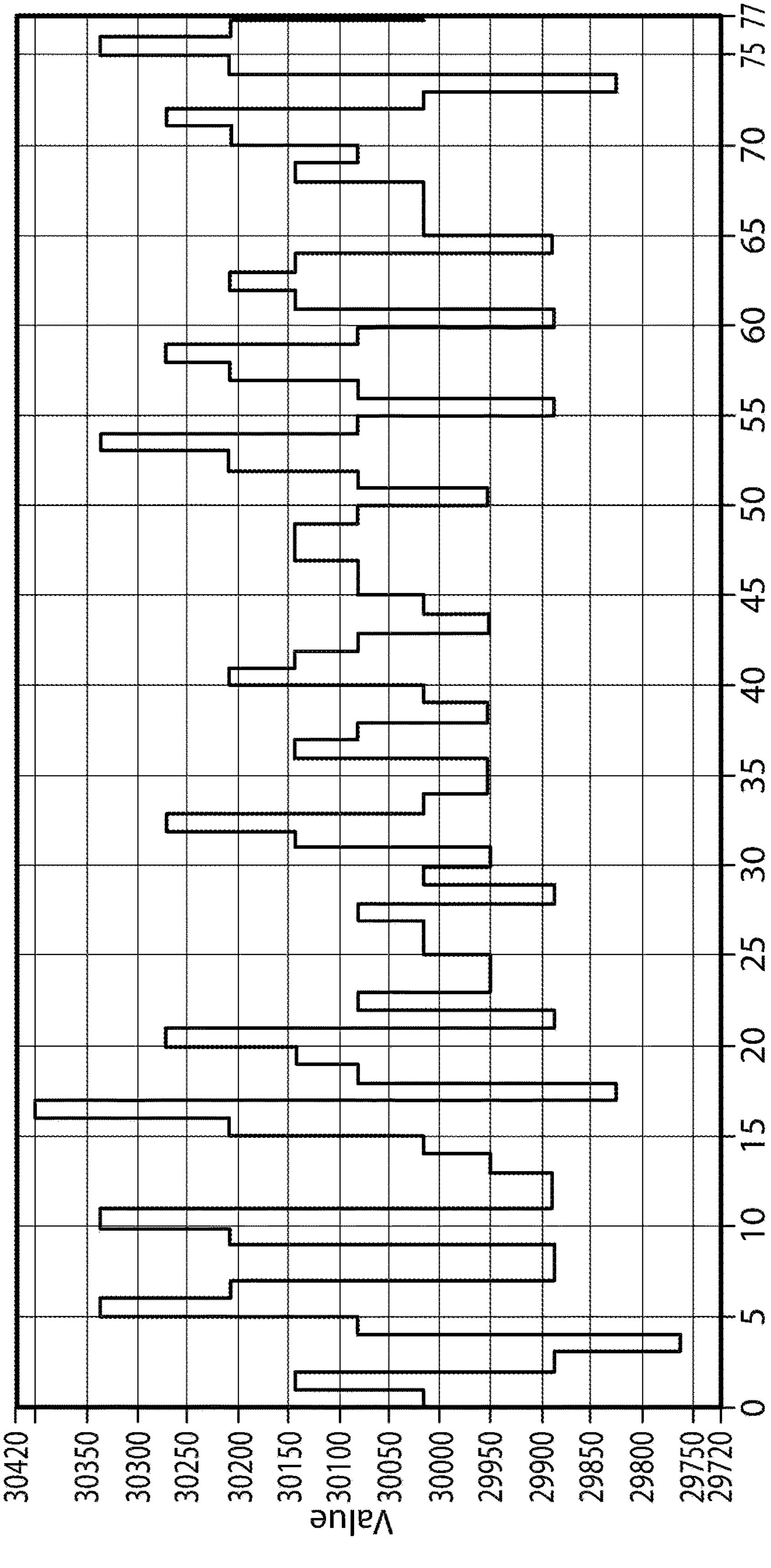
FIG. 8 depicts an exemplary digital signal corresponding to a weak reflection obscured by noise.

FIG. 8 depicts an exemplary digital signal corresponding to a weak reflection obscured by noise. In the depicted plot 800, without averaging, noise dominates the signal on a weak reflection.

Figure 9:
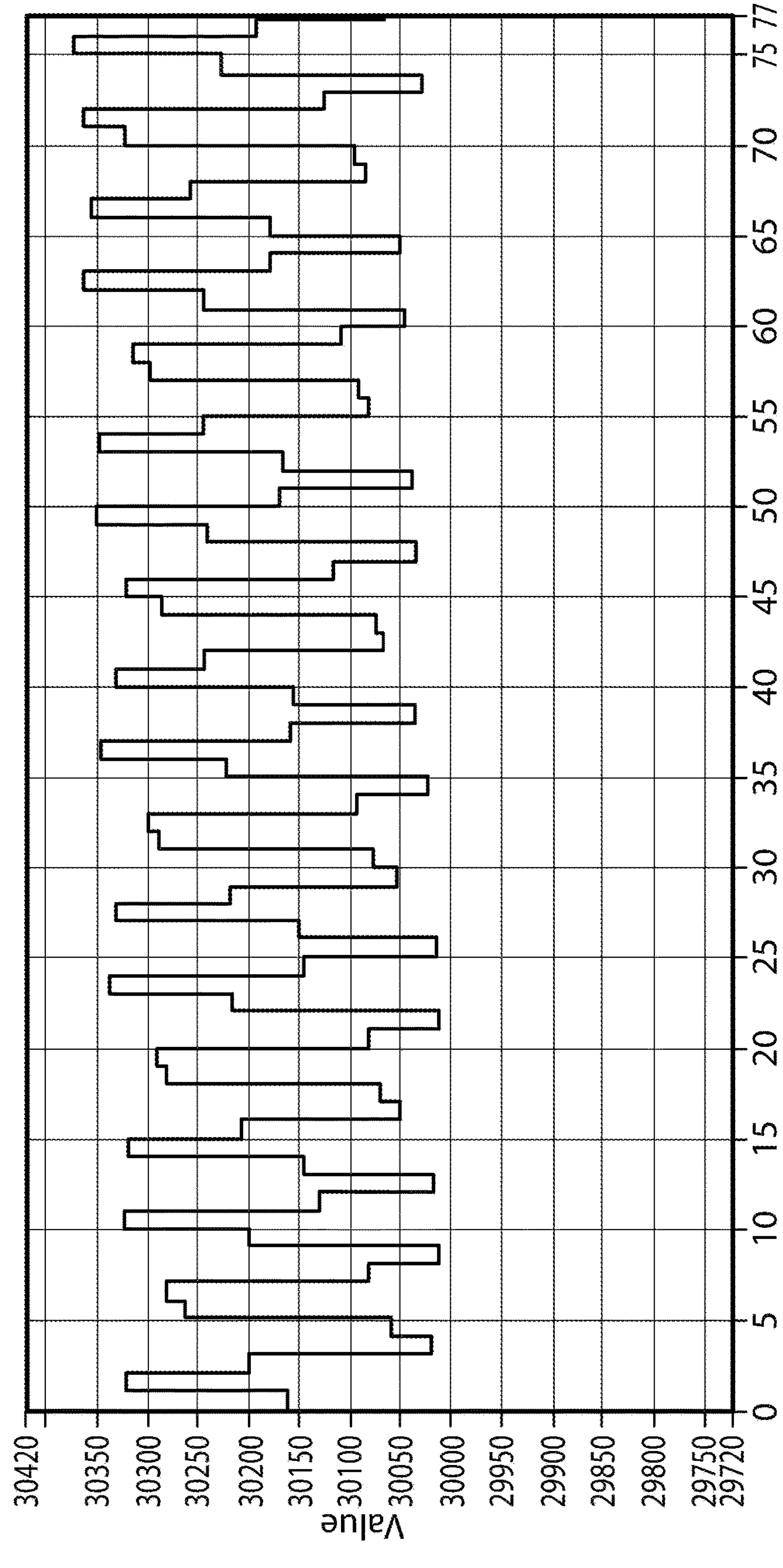
FIG. 9 depicts an exemplary digital signal corresponding to a weak reflection with averaging.

FIG. 9 depicts an exemplary digital signal corresponding to a weak reflection with averaging. In the depicted plot 900, in a same deployment environment as in FIG. 8, the signal dominates over noise.

Figure 10:
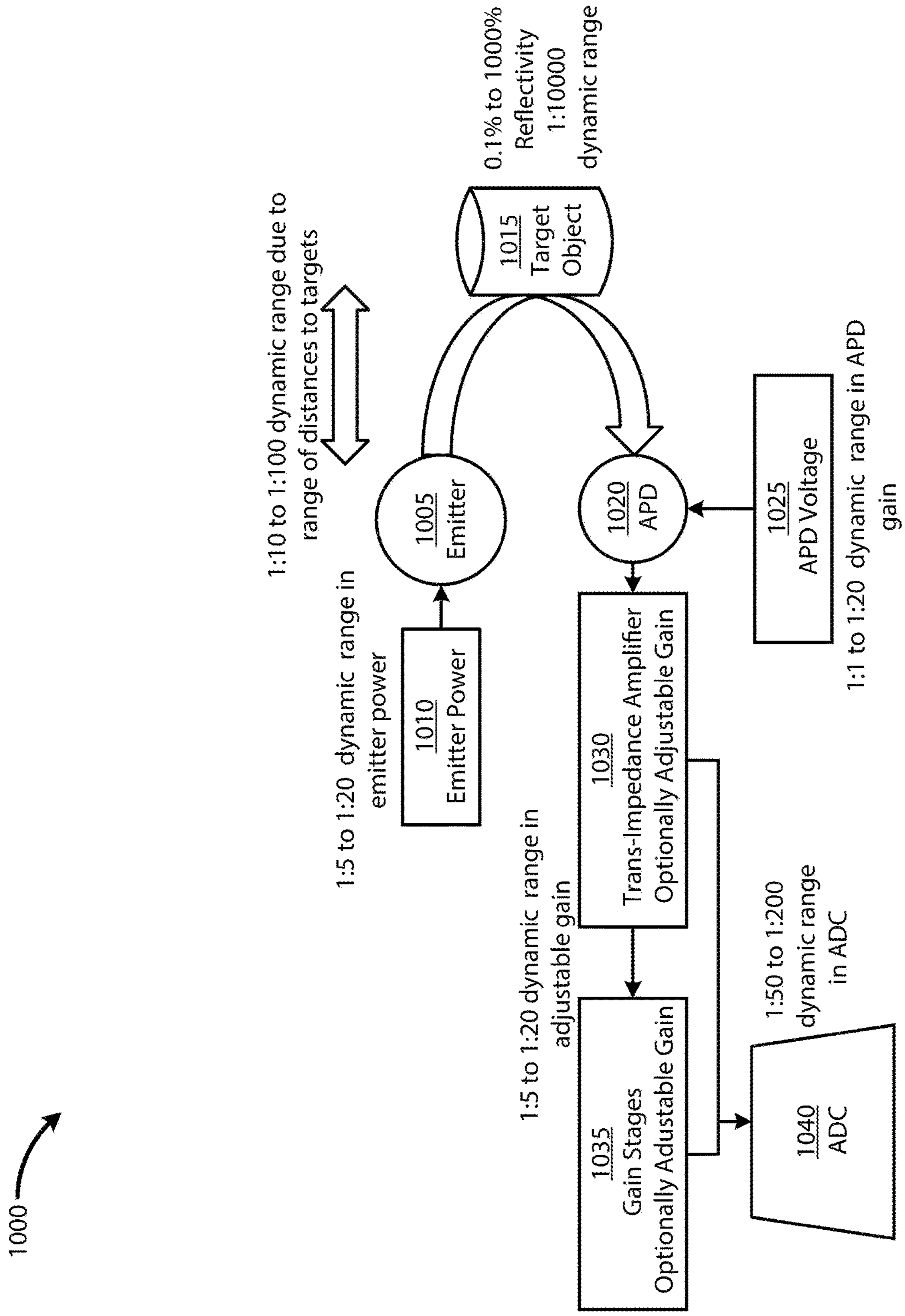
FIG. 10 depicts an exemplary block diagram of an exemplary SFPM TOF system in an illustrative use-case scenario with gain control.

FIG. 10 depicts an exemplary block diagram of an exemplary SFPM TOF system in an illustrative use-case scenario with gain control. In the depicted exemplary SFPM TOF system 1000, an emitter 1005 is controlled by an emitter power module 1010. In the illustrative depicted example, the emitter power module may, by way of example and not limitation, adjust emitter power by changing current to a laser. The emitter power module may, for example, provide between a 1:5 to 1:20 dynamic range in emitter power. In various examples, the emitter 1005 may emit a signal (e.g., electromagnetic signal) towards a target object 1015. The emitter 1005 may, for example, include a photoelectronic emitter. The emitter 1005 may, for example, include a laser and the emitted signal may include an optical beam(s). The emitter 1005 may, for example, include an LED. The emitter 1005 may, for example, emit a pulsed signal. The pulsed signal may, for example, be clocked. A monitor photodiode may, for example, measure characteristic(s) of the emitted signal.

Various embodiments may increase dynamic range by adjusting system gain. Both may, for example, require multiple (e.g., many) iterations of phase measurement for a given system response time. To maintain response times less than a predetermined maximum response time, a sufficiently efficient phase measurement may be employed. For example, some embodiments may be configured to have a response time less than 1 ms.

A receiver may, for example, receive a reflection of the emitted signal reflected off of the target object 1015. The receiver may, for example, include a photodetector. The photodetector may, as depicted, include an avalanche photodiode (APD 1020). The APD 1020 is driven by an APD voltage 1025 (e.g., reverse bias voltage). The APD voltage 1025 may, for example, represent a dynamic gain range from 1:1 to 1:20, as depicted.

In the depicted example, electronic circuit gain is applied to an output (e.g., voltage, current) of the APD 1020. As depicted, the electronic circuit gain may be provided by a trans-impedance amplifier (TIA 1030). The TIA 1030 may, for example, be implemented to adjust a gain of the output of the APD 1020.

In the depicted example, electronic circuit gain may be provided by a gain stage(s) (e.g., operational amplifier gain stage(s)) circuit(s) (gain stages 1035). The stages 1035 may, for example, be implemented to adjust the gain of the output of the APD 1020. In some embodiments the stages 1035 may operate directly on an output of the APD 1020. In some embodiments the stages 1035 may, for example, operate on an output of the TIA 1030. The electronic circuit gain (e.g., the TIA 1030 and/or the stages 1035) may, for example, provide between 1:5 to 1:20 dynamic range in adjustable gain. In some embodiments the TIA 1030 may, for example, be omitted. In some embodiments the stages 1035 may, for example, be omitted.

An analog to digital converter (ADC 1040) circuit may, as depicted, operate on an output of the stages 1035. The ADC 1040 may, for example, operate on an output of the TIA 1030. The ADC 1040 may, for example, provide between 1:50 to 1:200 dynamic (gain) range Example dynamic range of a system, where target distance (1:100) and target reflectivity (1:10000) require up to 1:100000 dynamic range, while the ADC measurement may only have around 1:200 dynamic range.

In some embodiments, gain control may be provided, such as disclosed with reference to FIG. 10. In the depicted example, ADC input voltage range combined with the noise floor may result in only around 1:200 dynamic range. Targets may, for example, span a 1:10000 dynamic range or more. Changing the gain may advantageously move the 1:200 visible window around the full 1:10000 range of possible inputs.

Various embodiments may be configured to provide sufficient time in the sensors update rate to allow for repeated averaging and gain change cycles. Determining the need for a gain change may, for example, be based on amplitudes of ADC samples. The amplitude of the frequency may, for example, be computed using frequency analysis. Various embodiments may perform gain decision based on frequency analysis. For example, various embodiments may advantageously isolate a desired gain level for a specific frequency.

In some embodiments, single frequency analysis may, for example, be computed. A single frequency analysis may, for example, be performed at more than one frequency. For instance, some embodiments may perform single frequency analysis at frequencies nearby to a center frequency. Such embodiments may, for example, advantageously analyze a power spectrum of noise frequencies. Such embodiments may, for example, advantageously interpolate a frequency that does not line up at an expected discrete frequency analysis (e.g., discrete Fourier transform (DFT)) bin (see, for example, FIG. 11).

Figure 11:
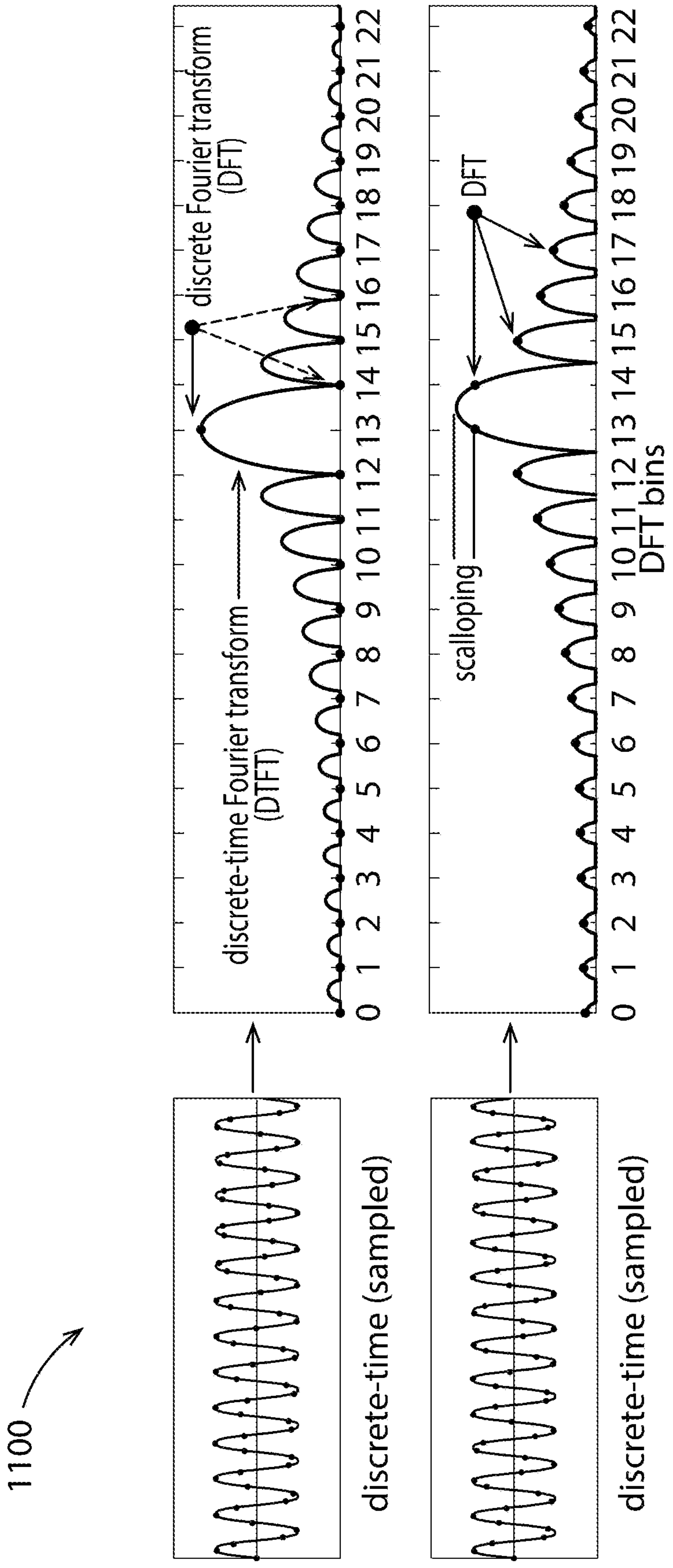
FIG. 11 depicts exemplary spectral leakage and spectral interpolation in a finite sampling window.

FIG. 11 depicts exemplary spectral leakage and spectral interpolation in a finite sampling window. Illustration 1100 depicts spectral leakage due to a finite sampling window, and spectral interpolation due to frequency not falling exactly at a DFT bin.

In various embodiments distance may be determined as a proportion to a measurement of phase shift of a receive signal relative to the modulation signal. In some embodiments an emitter (e.g., laser, VCSEL, EEL, LED) may not emit light with a same waveform shape and/or duty cycle as the modulation signal from the main processing element. Various embodiments may, for example, have an emitted signal affected by circuit delays, temperature changes, turn-on thresholds, rise times, or some combination thereof. Accordingly, an actual time that a signal (e.g., light) is emitted may be different from a modulation (e.g., command) signal.

Various embodiments may measure the emitted signal. For example, the embodiment disclosed at least with reference to FIG. 2 monitors the emitted light signal using a monitor photodiode. In various embodiments, an optical emitter component (e.g., lasers) may include a (integrated) monitor photodiode. Various embodiments may include an independent photodiode. For example, an independent photodiode may detect a fraction of the actual emitted light.

Figure 12:
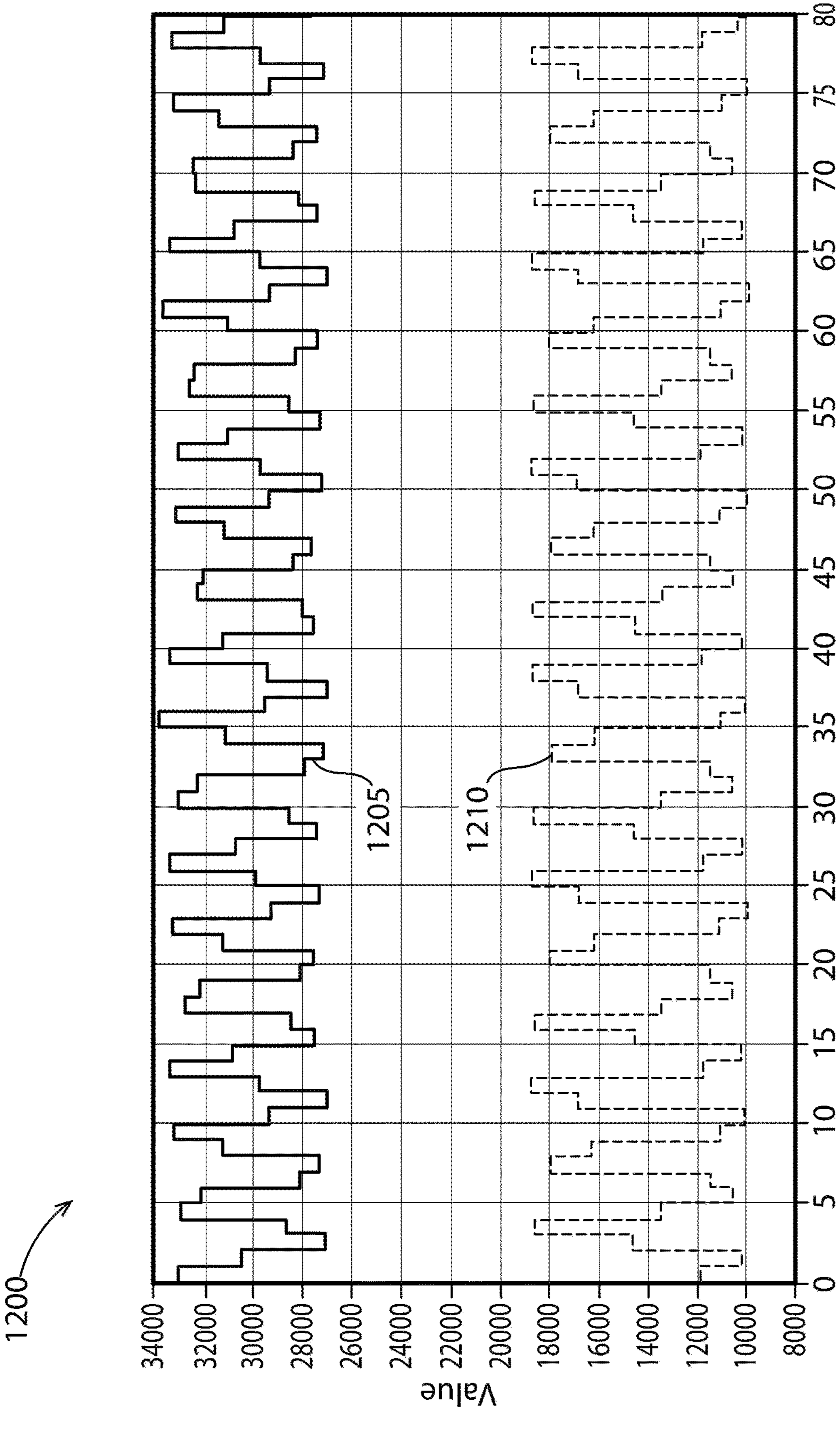
FIG. 12 depicts an exemplary signal received at an emitter compared to an emitted signal as measured by a monitoring circuit.

FIG. 12 depicts an exemplary signal received at an emitter compared to an emitted signal as measured by a monitoring circuit (e.g., the monitor photodiode 225). In the depicted example plot 1200, a phase of the received light 1205 less a phase of the emitted light 1210 reveals a significantly more accurate distance measurement than the phase of the received light alone.

Figure 13:
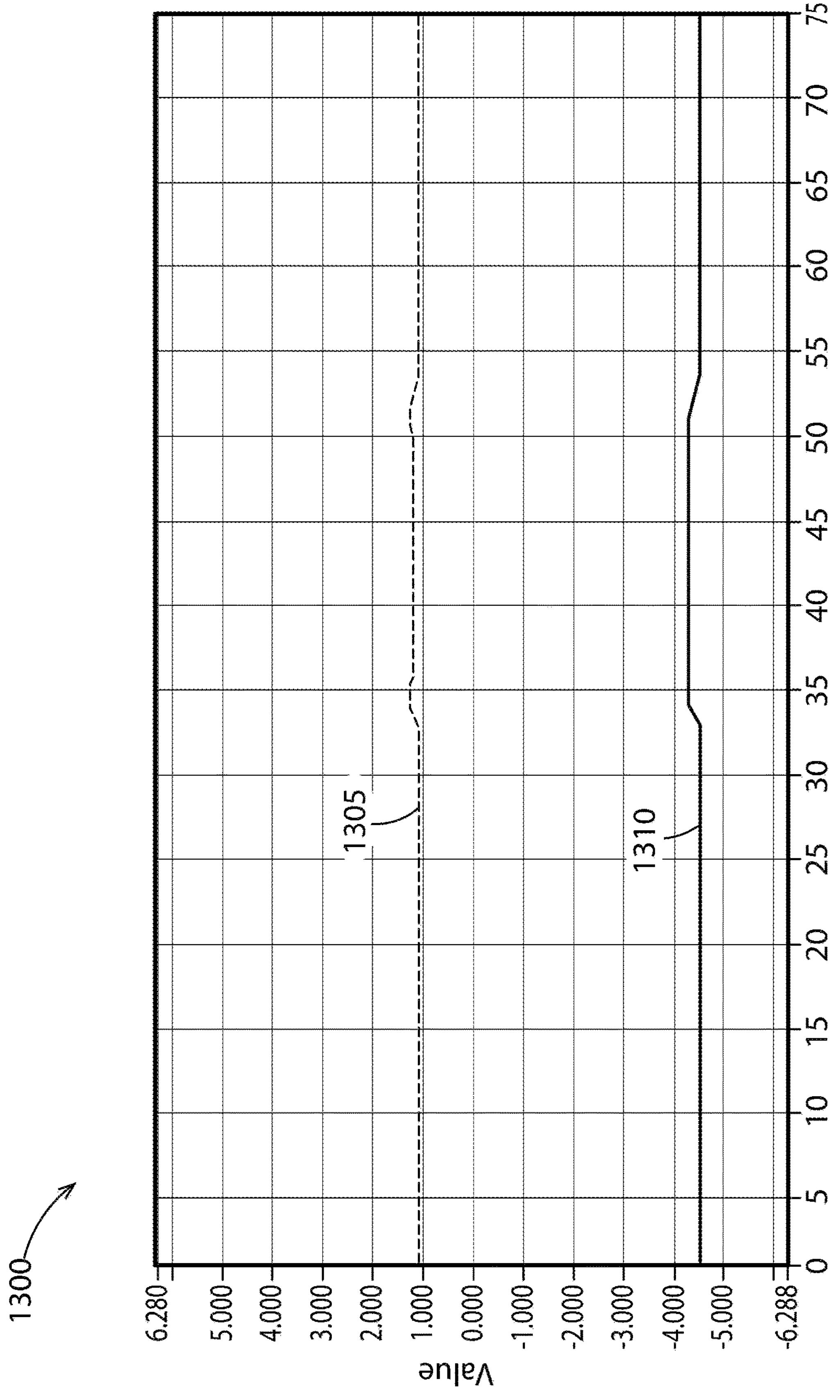
FIG. 13 depicts an exemplary phase signal of an exemplary signal received at an emitter compared to an emitted signal as measured by a monitoring circuit.

FIG. 13 depicts an exemplary phase signal of an exemplary signal received at an emitter compared to an emitted signal as measured by a monitoring circuit. In the depicted example plot 1300, a phase 1305 is measured off a received signal. A phase 1310 is measured off a monitor photodiode monitoring an emitted signal which is reflected and corresponds to the received signal. If the emitter firing is delayed, for example, relative to the modulation signal, there is a corresponding shift in both the monitor and received phases. Various embodiments may, for example, subtracted this shift out. Accordingly various embodiments may advantageously yield a received phase measurement with increased accuracy.

In some embodiments, a received signal may be measured separately from a monitor photodiode. Such embodiments may, for example, advantageously require only a single ADC (e.g., saving on size and/or cost). Some such embodiments may, for example, require a longer time to collect all required samples (e.g., of emitted and received signals). Some embodiments may, for example, simultaneously sample both signals (e.g., emitted and received signals). Such embodiments may, for example, advantageously allow faster response speed. Such embodiments may, for example, require more board space and/or cost for a second ADC.

For a given modulation frequency, a signal may phase wrap at a radians, or one wavelength. For example, a 10 MHz modulation would phase wrap at 100 ns, which may correspond to 15 meters of range. Various embodiments may, for example, be configured to measure distances farther than the phase wrap distance. Various embodiments may, for example, distinguish unintended reflections from beyond the phase wrap distance.

In some embodiments (e.g., as disclosed at least with reference to FIG. 14), more than one frequency of modulation may be used. The distance measurements may be combined to disambiguate a true distance, which may be farther than the phase wrap distance for any single modulation frequency.

Figure 14:
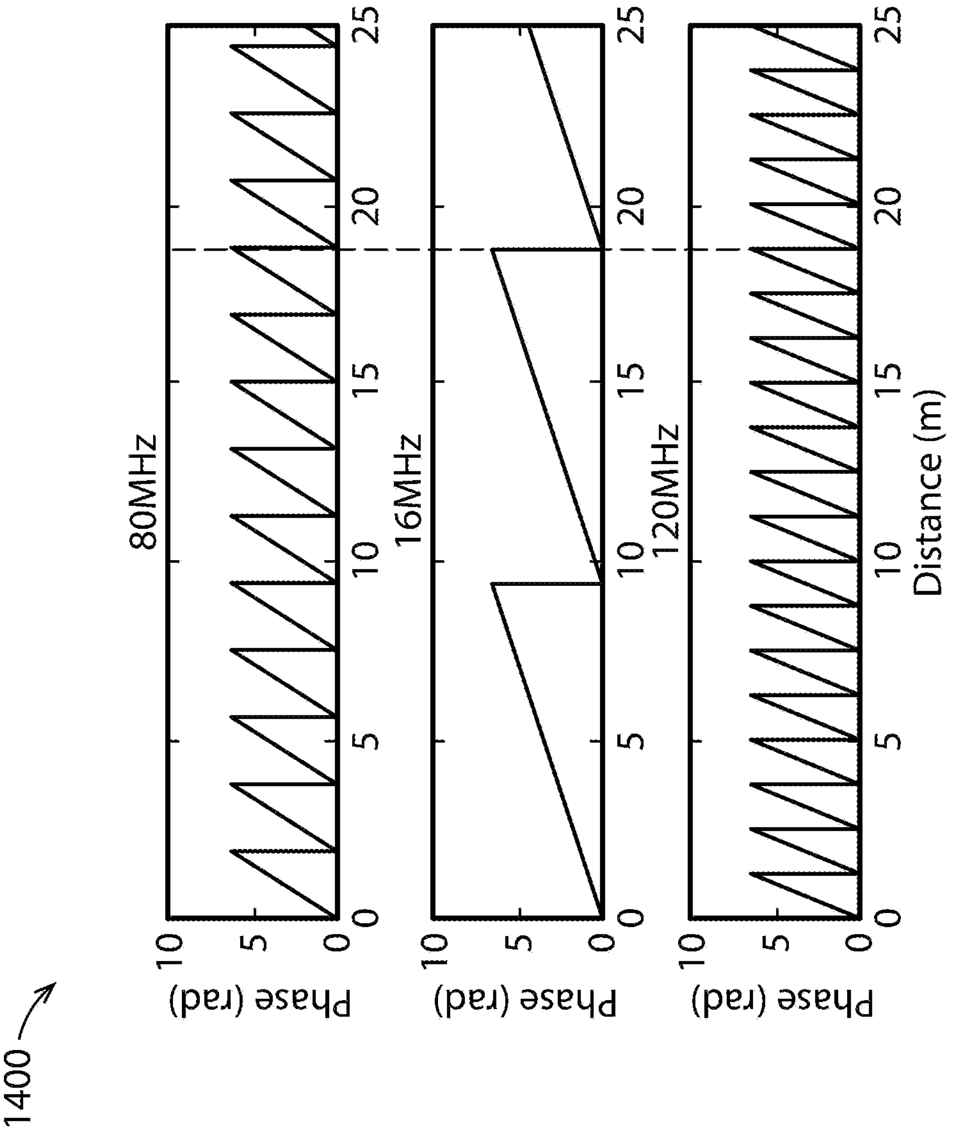
FIG. 14 depicts an exemplary set of three frequencies which may be used to disambiguate phase.

FIG. 14 depicts an exemplary set of three frequencies which may be used to disambiguate phase. The use of multiple (known) emitter modulation frequencies may, for example, enable an SFPM TOF system to disambiguate distances farther than the phase wrap distance of a single frequency. For example, at least two (known emitter modulation) frequencies may be analyzed by single frequency analysis. In some embodiments, frequency analysis may be configured to perform frequency analysis on multiple, selected frequencies simultaneously. Some embodiments may, for example, use three frequencies (e.g., as depicted in the plot 1400). Some embodiments may use more than three frequencies.

Figure 15:
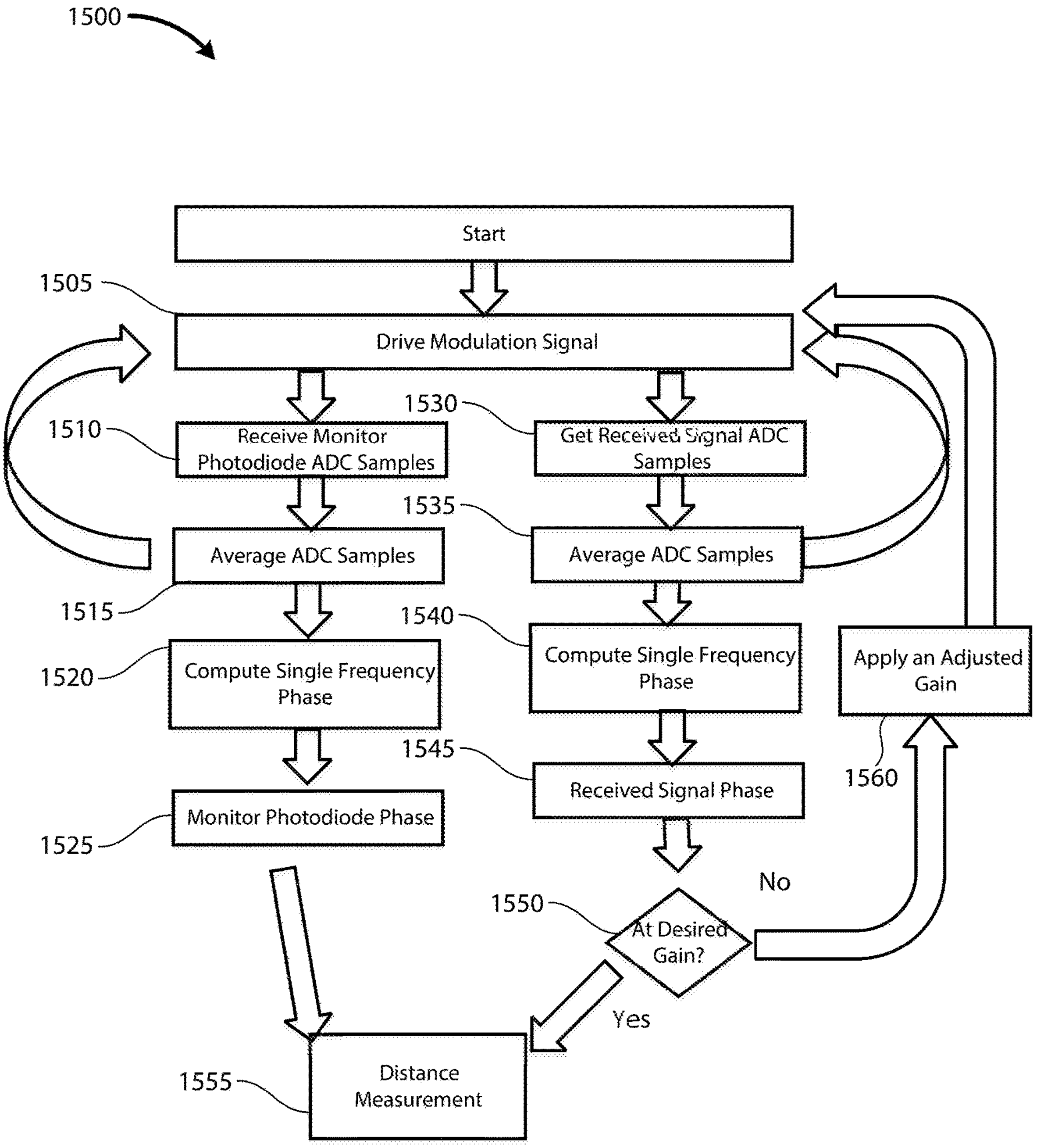
FIG. 15 depicts an exemplary method of measuring distance using an SFPM TOF sensor.

FIG. 15 depicts an exemplary method of measuring distance using an SFPM TOF sensor. In a method 1500, a received signal may be sampled by an ADC. The ADC values may be averaged together to improve signal to noise. Efficient single frequency analysis may be performed to determine, for example, an amplitude and phase of the signal. Gain control may adjust the gain, if necessary. The ADC sampling and averaging process may be repeated for a monitor photodiode. The results of both may be combined to determine the distance measurement of the system.

In this example, the method 1500 begins when a drive modulation signal is emitted in step 1505. In step 1510, ADC samples are received from a monitor photodiode. Next, in step 1515, average ADC samples are received by multiple iteration of the step 1505 in different frequencies. After the average ADC samples are computed, a single frequency analysis is performed to the averaged ADC sample of the monitor photodiode signals in step 1520. In step 1525, the monitor photodiode phase is determined.

In step 1530, ADC samples are received from a receiver. Next, in step 1535, average ADC samples are received by multiple iteration of the step 1505 in different frequencies. In step 1540, single frequency analysis is performed to the ADC samples of the received signals. The received signal phase is determined in step 1545. In a decision point 1550, it is determined whether the ADC samples of the received signals are sampled at a desired gain. For example, the need for a gain change may, for example, be determined based on amplitudes of ADC samples. If it is determined that the ADC samples of the received signals are sampled at a desired gain, in step 1555, a distance measurement is computed based on the monitor photodiode phase and the received signal phase, and the method 1500 ends. If it is determined that the ADC samples of the received signals are sampled at a desired gain, an adjusted output gain is applied in step 1560 and the step 1505 is repeated.

Although various embodiments have been described with reference to the figures, other embodiments are possible.

Although an exemplary system has been described with reference to the figures, other implementations may be deployed in other industrial, scientific, medical, commercial, and/or residential applications.

In various embodiments, some bypass circuits implementations may be controlled in response to signals from analog or digital components, which may be discrete, integrated, or a combination of each. Some embodiments may include programmed, programmable devices, or some combination thereof (e.g., PLAs, PLDs, ASICs, microcontroller, microprocessor), and may include one or more data stores (e.g., cell, register, block, page) that provide single or multi-level digital data storage capability, and which may be volatile, non-volatile, or some combination thereof. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

Although an example of a system, which may be portable, has been described with reference to the above figures, other implementations may be deployed in other processing applications, such as desktop and networked environments.

Temporary auxiliary energy inputs may be received, for example, from chargeable or single use batteries, which may enable use in portable or remote applications. Some embodiments may operate with other DC voltage sources, such as a 9V (nominal) battery, for example. Alternating current (AC) inputs, which may be provided, for example from a 50/60 Hz power port, or from a portable electric generator, may be received via a rectifier and appropriate scaling. Provision for AC (e.g., sine wave, square wave, triangular wave) inputs may include a line frequency transformer to provide voltage step-up, voltage step-down, and/or isolation.

Although particular features of an architecture have been described, other features may be incorporated to improve performance. For example, caching (e.g., L1, L2, . . . ) techniques may be used. Random access memory may be included, for example, to provide scratch pad memory and or to load executable code or parameter information stored for use during runtime operations. Other hardware and software may be provided to perform operations, such as network or other communications using one or more protocols, wireless (e.g., infrared) communications, stored operational energy and power supplies (e.g., batteries), switching and/or linear power supply circuits, software maintenance (e.g., self-test, upgrades), and the like. One or more communication interfaces may be provided in support of data storage and related operations.

Some systems may be implemented as a computer system that can be used with various implementations. For example, various implementations may include digital circuitry, analog circuitry, computer hardware, firmware, software, or combinations thereof. Apparatus can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Various embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and CD-ROM and DVD-ROM disks. The processor and the memory can be supplemented by, or incorporated in, ASICs (application-specific integrated circuits).

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, the computers and networks forming the Internet, or some combination thereof. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, multiplexing techniques based on frequency, time, or code division, or some combination thereof. Some implementations may optionally incorporate features such as error checking and correction (ECC) for data integrity, or security measures, such as encryption (e.g., WEP) and password protection.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Various examples of modules may be implemented using circuitry, including various electronic hardware. By way of example and not limitation, the hardware may include transistors, resistors, capacitors, switches, integrated circuits, other modules, or some combination thereof. In various examples, the modules may include analog logic, digital logic, discrete components, traces and/or memory circuits fabricated on a silicon substrate including various integrated circuits (e.g., FPGAs, ASICs), or some combination thereof. In some embodiments, the module(s) may involve execution of preprogrammed instructions, software executed by a processor, or some combination thereof. For example, various modules may involve both hardware and software.

In an exemplary aspect, a method of indirect time-of-flight distance measurement may include an emitter element emitting photons modulated by one or more frequencies. A receiving element may generate a signal in response to receiving a fraction of those photons that reflect off a target object. An ADC element may digitize the signal generated by the receiving element. A processing element may generate a phase signal using frequency analysis of at least one selected frequency. A distance measurement signal may be generated as a function of the phase signal.

The frequency analysis may include a single-frequency analysis. The single-frequency analysis may include a Goertzel filter.

The at least one selected frequency may be a modulation frequency of the emitted photons. The frequency analysis may include single-frequency analysis at the modulation frequency.

The at least one selected frequency may include at least two modulation frequencies of the emitted photons. The frequency analysis may include single-frequency analysis at each of the at least two modulation frequencies such that a distance beyond a phase wrap distance of any of the at least two frequencies is disambiguated.

The phase signal may be generated as a function of a difference between the received signal and a monitor photodiode signal.

Multiple iterations of ADC sampling may be averaged together prior to generating the phase signal.

In an illustrative aspect, a distance measurement device may include an emitter (e.g., 115) configured to emit a modulated waveform (e.g., 120) in at least one predetermined drive frequency. The device may include a monitoring photodiode (e.g., 225) configured to generate a reference signal in response to measuring the emitted modulated waveform. The device may include a receiver (e.g., 130) configured to generate a received signal in response to a received waveform (e.g., 125). The received waveform may include a reflection of the emitted modulated waveform. The device may include at least one analog-to-digital converter (ADC) (e.g., 230) configured to generate ADC samples by digitizing the reference signal and digitizing the received signal. The device may include at least one gain control stage (e.g., one or more stages shown in 1000) configured to selectively control an output gain of the ADC such that a dynamic range spans from 1:50 to at least 1:100,000. The device may include a processing circuit (e.g., 135) configured to determine a distance between the emitter and a target surface by distance determination operations (e.g., one or more steps shown in 1500). The operations may include generate a pre-averaged received signal by averaging across multiple ADC samples of the received signal. The operations may include determine a phase offset using a first digital single frequency analysis of the averaged ADC samples of the received signal, and a second digital single frequency analysis of the ADC samples of the reference signal. The first and the second digital single frequency analyses may each be performed at the predetermined drive frequency of the modulated waveform.

The at least one gain control stage may include at least two of: an avalanche photodiode gain, an amplifier circuit gain, and an ADC gain.

The processing circuit may be configured to selectively apply the output gain as a function of an amplitude of frequency computed using the first digital single frequency analysis.

The selectively applied output gain may include a first selectable gain applied to an output of the emitter. The selectively applied output gain may include a second selectable gain applied to a control voltage of the receiver. The selectively applied output gain may include a third selectable gain applied to the received signal generated by the receiver.

The emitter may emit the modulated waveform in at least two predetermined modulated frequencies such that a distance beyond a phase wrap distance of the predetermined modulated frequencies is disambiguated.

The first and second digital single frequency analyses may each include a single-frequency Goertzel analysis.

The processing circuit may include a commodity integrated circuit.

The distance measurement device may include two ADCs, such that the reference signal and the received signal are simultaneously sampled.

In an illustrative aspect, a distance measurement device may include an emitter (e.g., 115) configured to emit a modulated waveform (e.g., 120) in at least one predetermined drive frequency. The device may include a monitoring photodiode (e.g., 225) configured to generate a reference signal in response to measuring the emitted modulated waveform. The device may include a receiver (e.g., 130) configured to generate a received signal in response to a received waveform (e.g., 125). The received waveform may include a reflection of the emitted modulated waveform. The device may include at least one analog-to-digital converter (ADC) (e.g., 230) configured to digitize the reference signal and the received signal. The device may include a processing circuit (e.g., 135) configured to determine a distance between the emitter and a target surface by distance determination operations (e.g., one or more steps shown in 1500). The operations may include generate a pre-averaged received signal by averaging across multiple ADC samples of the received signal. The operations may include determine a phase offset using a first digital single frequency analysis of the pre-averaged received signal, and a second digital single frequency analysis of the ADC samples of the reference signal. The first and the second digital single frequency analyses may each be performed at the predetermined drive frequency of the modulated waveform.

The distance measurement device may include at least one gain control stage configured to control an output gain of the ADC such that a dynamic range spans from 1:50 to at least 1:100,000.

The at least one gain control stage may include at least two of an emitter gain, an amplifier circuit gain, and an ADC gain.

The processing circuit may be configured to selectively apply the output gain as a function of an amplitude of frequency computed using the first digital single frequency analysis.

The selectively applied output gain may include a first selectable gain applied to an output of the emitter. The selectively applied output gain may include a second selectable gain applied to a control voltage of the receiver. The selectively applied output gain may include a third selectable gain applied to the received signal generated by the receiver.

The emitter may emit the modulated waveform in at least two predetermined modulated frequencies such that a distance beyond a phase wrap distance of the predetermined modulated frequencies is disambiguated.

The first and second digital single frequency analyses may include a single-frequency Goertzel analysis.

The processing circuit may include a commodity integrated circuit.

The distance measurement device may include two ADCs, such that the reference signal and the received signal are simultaneously sampled.

In an illustrative aspect, a method of indirect time-of-flight distance measurement may include emit a first modulated signal at a first predetermined modulation frequency. The method may include receive a first measured ADC sample of the first modulated signal. The method may include emit a second modulated signal at a second predetermined modulation frequency. The method may include receive a second measured ADC sample of the second emitted modulated signal. The method may include determine an averaged emitter ADC sample based on the first measured ADC sample and the second ADC sample. The method may include receive a third measured ADC sample of a first received signal. The first received signal may be generated based on a measured reflected signal of the first modulated signal from a target object. The method may include receive a fourth measured ADC sample of a second received signal. The second received signal may be generated based on a measured reflected signal of the second modulated signal from a target object. The method may include apply an output gain to the third measured ADC sample and the fourth ADC sample such that the noise to signal ratio is reduced. The method may include determine an averaged receiver ADC sample based on the third measured ADC sample and the fourth ADC sample. The method may include determine a received signal phase based on the averaged receiver ADC sample using a first single frequency digital analysis, and determine an emitter signal phase based on the averaged emitter ADC sample using a second single frequency digital analysis. The method may include determine a distance measurement as a function of the received signal phase and the emitter signal phase.

The first and second digital single frequency analyses may include a single-frequency Goertzel analysis.

The method may include determine whether the output gain is within a predetermined gain range based on an amplitude of frequency computed using the first digital single frequency analysis. The method may include apply an adjusted output gain such that the output gain of the averaged receiver ADC sample is within the predetermined gain range.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A distance measurement device comprising:

an emitter (115) configured to emit a modulated waveform (120) in at least one predetermined drive frequency;

a monitoring photodiode (225) configured to generate a reference signal in response to measuring the emitted modulated waveform;

a receiver (130) configured to generate a received signal in response to a received waveform (125), wherein the received waveform comprises a reflection of the emitted modulated waveform;

at least one analog-to-digital converter (ADC) (230) configured to generate ADC samples by digitizing the reference signal and digitizing the received signal;

at least one gain control stage (1000) configured to selectively control an output gain of the ADC such that a dynamic range spans from 1:50 to at least 1:100,000; and, a processing circuit (135) configured to determine a distance between the emitter and a target surface by distance determination operations (1500), the operations comprising:

generate a pre-averaged received signal by averaging across multiple ADC samples of the received signal, and, determine a phase offset using a first digital single frequency analysis of the averaged ADC samples of the received signal, and a second digital single frequency analysis of the ADC samples of the reference signal, wherein the first and the second digital single frequency analyses are each performed at the predetermined drive frequency of the modulated waveform.

2. The distance measurement device of claim 1, wherein the at least one gain control stage comprises at least two of: an avalanche photodiode gain, an amplifier circuit gain, and an ADC gain.

3. The distance measurement device of claim 1, wherein the processing circuit is configured to selectively apply the output gain as a function of an amplitude of frequency computed using the first digital single frequency analysis.

4. The distance measurement device of claim 3, wherein the selectively applied output gain comprises:

a first selectable gain applied to an output of the emitter;

a second selectable gain applied to a control voltage of the receiver; and, a third selectable gain applied to the received signal generated by the receiver.

5. The distance measurement device of claim 1, wherein the emitter emits the modulated waveform in at least two predetermined modulated frequencies such that a distance beyond a phase wrap distance of the predetermined modulated frequencies is disambiguated.

6. The distance measurement device of claim 1, wherein the first and second digital single frequency analyses each comprise a single-frequency Goertzel analysis.

7. The distance measurement device of claim 1, wherein the processing circuit comprises a commodity integrated circuit.

8. The distance measurement device of claim 1, further comprising two ADCs, such that the reference signal and the received signal are simultaneously sampled.

9. A distance measurement device comprising:

an emitter (115) configured to emit a modulated waveform (120) in at least one predetermined drive frequency;

a monitoring photodiode (225) configured to generate a reference signal in response to measuring the emitted modulated waveform;

a receiver (130) configured to generate a received signal in response to a received waveform (125), wherein the received waveform comprises a reflection of the emitted modulated waveform;

at least one analog-to-digital converter (ADC) (230) configured to digitize the reference signal and the received signal; and, a processing circuit (135) configured to determine a distance between the emitter and a target surface by distance determination operations (1500), the operations comprising:

generate a pre-averaged received signal by averaging across multiple ADC samples of the received signal, and, determine a phase offset using a first digital single frequency analysis of the pre-averaged received signal, and a second digital single frequency analysis of the ADC samples of the reference signal, wherein the first and the second digital single frequency analyses are each performed at the predetermined drive frequency of the modulated waveform.

10. The distance measurement device of claim 9, further comprising at least one gain control stage configured to control an output gain of the ADC such that a dynamic range spans from 1:50 to at least 1:100,000.

11. The distance measurement device of claim 9, wherein the at least one gain control stage comprises an emitter gain, an amplifier circuit gain, and an ADC gain.

12. The distance measurement device of claim 9, wherein the processing circuit is configured to selectively apply the output gain as a function of an amplitude of frequency computed using the first digital single frequency analysis.

13. The distance measurement device of claim 12, wherein the selectively applied output gain comprises:

a first selectable gain applied to an output of the emitter;

a second selectable gain applied to a control voltage of the receiver; and, a third selectable gain applied to the received signal generated by the receiver.

14. The distance measurement device of claim 9, where in the emitter emits the modulated waveform in at least two predetermined modulated frequencies such that a distance beyond a phase wrap distance of the predetermined modulated frequencies is disambiguated.

15. The distance measurement device of claim 9, wherein the first and second digital single frequency analyses comprise a single-frequency Goertzel analysis.

16. The distance measurement device of claim 9, wherein the processing circuit comprises a commodity integrated circuit.

17. The distance measurement device of claim 9, further comprising two ADCs, such that the reference signal and the received signal are simultaneously sampled.

18. A method of indirect time-of-flight distance measurement comprising:

emit a first modulated signal at a first predetermined modulation frequency;

receive a first measured ADC sample of the first modulated signal;

emit a second modulated signal at a second predetermined modulation frequency;

receive a second measured ADC sample of the second emitted modulated signal;

determine an averaged emitter ADC sample based on the first measured ADC sample and the second ADC sample;

receive a third measured ADC sample of a first received signal, wherein the first received signal is generated based on a measured reflected signal of the first modulated signal from a target object;

receive a fourth measured ADC sample of a second received signal, wherein the second received signal is generated based on a measured reflected signal of the second modulated signal from a target object;

apply an output gain to the third measured ADC sample and the fourth ADC sample such that the noise to signal ratio is reduced;

determine an averaged receiver ADC sample based on the third measured ADC sample and the fourth ADC sample;

determine a received signal phase based on the averaged receiver ADC sample using a first single frequency digital analysis, and determine an emitter signal phase based on the averaged emitter ADC sample using a second single frequency digital analysis; and, determine a distance measurement as a function of the received signal phase and the emitter signal phase.

19. The method of indirect time-of-flight distance measurement of claim 18, wherein the first and second digital single frequency analyses comprise a single-frequency Goertzel analysis.

20. The method of indirect time-of-flight distance measurement of claim 18, further comprising:

determine whether the output gain is within a predetermined gain range based on an amplitude of frequency computed using the first digital single frequency analysis; and, apply an adjusted output gain such that the output gain of the averaged receiver ADC sample is within the predetermined gain range.

* * * * *